(12) United States Patent
Binaghi et al.

(10) Patent No.: US 11,453,606 B2
(45) Date of Patent: Sep. 27, 2022

(54) PROCESS AND PLANT FOR PURIFICATION OF WASTE FROM ZOOTECHNICAL SOURCES

(71) Applicant: CAMPAGNA & PARTNERS S.r.l., Manerbio (IT)

(72) Inventors: Diego Binaghi, Pavia (IT); Marco Baldi, Belgioioso (IT)

(73) Assignee: CAMPAGNA & PARTNERS S.R.L., Brescia (IT)

( * ) Notice: Subject to any disclaimer, the term of this patent is extended or adjusted under 35 U.S.C. 154(b) by 127 days.

(21) Appl. No.: 16/742,136

(22) Filed: Jan. 14, 2020

(65) Prior Publication Data
US 2020/0223730 A1    Jul. 16, 2020

(30) Foreign Application Priority Data

Jan. 14, 2019 (IT) ................ 102019000000553

(51) Int. Cl.
| | |
|---|---|
| *C02F 9/00* | (2006.01) |
| *B01D 53/18* | (2006.01) |
| *C02F 1/20* | (2006.01) |
| *C02F 3/28* | (2006.01) |
| *C02F 11/04* | (2006.01) |
| *C02F 101/16* | (2006.01) |
| *C02F 103/06* | (2006.01) |
| *C02F 103/20* | (2006.01) |
| *C02F 103/32* | (2006.01) |

(52) U.S. Cl.
CPC .............. *C02F 9/00* (2013.01); *B01D 53/18* (2013.01); *C02F 1/20* (2013.01); *C02F 3/2866* (2013.01); *C02F 11/04* (2013.01); *C02F 2101/16* (2013.01); *C02F 2103/06* (2013.01); *C02F 2103/20* (2013.01); *C02F 2103/32* (2013.01); *C02F 2303/10* (2013.01); *C02F 2303/24* (2013.01)

(58) Field of Classification Search
CPC .. C02F 11/04; C02F 2101/16; C02F 2103/20; C02F 9/00; B01D 53/18
USPC ................................ 210/603, 180, 188, 252
See application file for complete search history.

(56) References Cited

U.S. PATENT DOCUMENTS

| | | | | |
|---|---|---|---|---|
| 5,389,126 | A * | 2/1995 | Baker | B01D 5/0057 95/258 |
| 6,464,875 | B1 | 10/2002 | Woodruff | |
| 2005/0139546 | A1* | 6/2005 | Burke | C02F 3/06 210/603 |
| 2006/0006055 | A1* | 1/2006 | Bonde | C12M 23/36 203/73 |
| 2008/0302722 | A1* | 12/2008 | Burke | C02F 1/20 210/603 |
| 2011/0048230 | A1* | 3/2011 | Baldi | B01D 19/0005 95/85 |
| 2014/0263100 | A1* | 9/2014 | Kumar | C05F 17/50 210/770 |

(Continued)

OTHER PUBLICATIONS

Italian Search Report for IT102019000000553, dated Sep. 24, 2019, 9 pages.

*Primary Examiner* — Claire A Norris
(74) *Attorney, Agent, or Firm* — McAndrews, Held & Malloy, Ltd.

(57) ABSTRACT

A process for purification of waste from zootechnical sources or from small agri-food companies is provided. A (Continued)

plant for carrying out the wastewater treatment process is also provided.

7 Claims, 4 Drawing Sheets

(56) References Cited

U.S. PATENT DOCUMENTS

2015/0329399 A1　11/2015　Kumar et al.

* cited by examiner

PROCESS AND PLANT FOR PURIFICATION OF WASTE FROM ZOOTECHNICAL SOURCES

CROSS REFERENCE TO RELATED APPLICATION

This application claims priority to and benefit of Italian Patent Application No. 102019000000553 filed Jan. 14, 2019, the contents of which are incorporated by reference in their entirety.

FIELD OF THE INVENTION

The present invention finds application in the field of purification of waste from zootechnical sources and from small agri-food companies.

BACKGROUND OF THE INVENTION

The Community Directive 94/676/EEC, more commonly known as the Nitrates Directive, dictated the fundamental principles for the use of effluents of zootechnical origin and waste water from small food companies. The fundamental principles of this directive have been implemented at national level with Legislative Decree no. 152/1999 and the Ministerial Decree 7 Apr. 2006. The legislation then has regional application.

The problem relating to the management of zootechnical waste is known.

Suffice it to say that a pig farm with 10,000 pigs produces about 100 m3/d of slurry, containing on average about 4-5 kg/m3 of nitrogen reduced in ammonia form for about ⅔ and protein/nucleic acids for the remaining fraction.

Based on the provisions of the Nitrates Directive, and taking into account that the mass of zootechnical nitrogen made available daily is equal to 400-500 kg, the spreading of this mass of waste requires about 3 ha/d or about 1,100 hectares for a breeding that operates on an on-going basis.

In fact, in tensioned areas, farms do not have sufficient agricultural land to manage the mass of zootechnical waste they produce.

Hence the need to reduce the mass of zootechnical nitrogen to be introduced onto agricultural land.

The available techniques are: i) biological/anoxic process of nitrification and denitrification, ii) solid/liquid separation with ex-post treatment of the solid fraction, iii) stripping of ammonia with recovery of the same in the form of ammonium salts (sulphates, phosphates and nitrates).

The solid/liquid separation process, more or less coarse, is a constant of each treatment chain; in fact it is always present, with different levels of efficiency, upstream of the sections of both nitrification/denitrification and stripping/adsorption.

Depending on the solid/liquid separation efficiency, the ratio between inorganic-reduced nitrogen and organic-reduced nitrogen in the "liquid" fraction changes considerably; low levels of separation efficiency leave the 2:1 ratio substantially unchanged, while high levels of solid/liquid separation, obtainable for example by using centrifugal decanters, can raise this ratio up to 9:1.

The nitro/denitro biological process has been largely abandoned, as it requires a significant consumption of electricity and, above all, leads to the transformation of bio-available nitrogen into molecular nitrogen, that is, it does not allow the recovery of a resource such as the ammonium ion present in the manure.

The recovery of the various forms of nitrogen present in the manure, in order to ensure its correct and optimal use, is of fundamental importance with a view to the circular management of resources.

The ammonia stripping/absorption process is able to respond correctly to this need; some problems due to the dependence of the ammonia-ammonium ion balance on temperature and pH remain to be overcome.

SUMMARY OF THE INVENTION

The present invention relates to a process which overcomes the problems of the prior art and comprises a batch stripping step and a continuous ammonia absorption step.

An object of the present invention is a process for the purification of wastewater from farms and wastewater from small food companies.

Another object is a plant which implements the process of the invention.

DETAILED DESCRIPTION OF THE INVENTION

Figure 1:
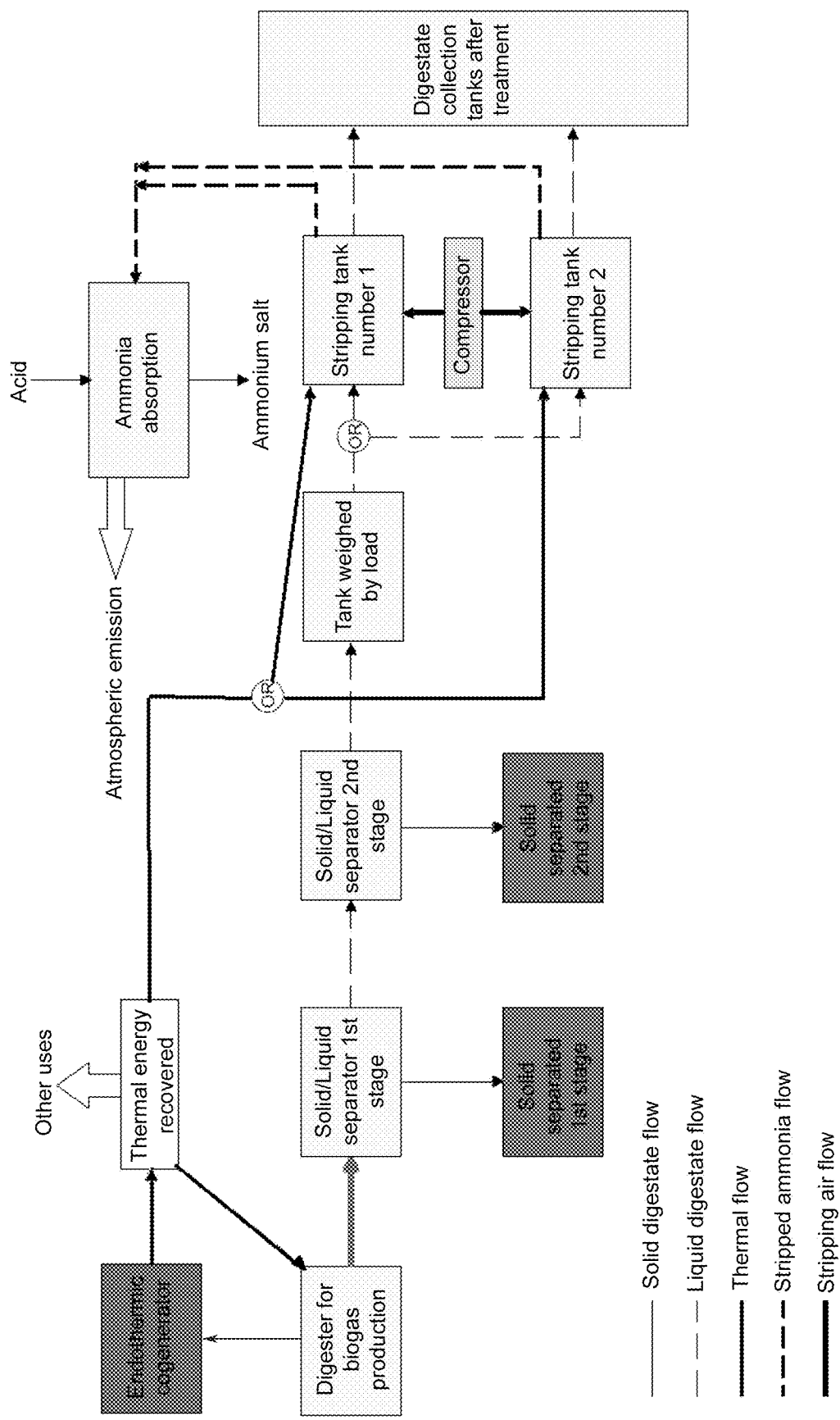
FIG. 1 shows a block diagram of the operation of the process of the invention.

According to the present invention, a process for the purification of wastewater comprises the steps of:
a) digestion,
b) solid/liquid separation,
c) stripping,
d) absorption of ammonia,
e) cogeneration.

For the purposes of the present invention, "waste" means waste water from farms or waste water from small food companies or waste contaminated with ammonia, as it could be for digestion from OFMSW and landfill leachate, located upstream of the possible chemical/physical and biological purification process, or as a single step if the conditions required for discharge allow it.

The described technology can also find application for purification of wastewater similar to the water listed above.

In one aspect of the invention, gas develops in the digestion step a).

In fact, within the bio-digester the transformation of the protein substances present in the animal excrements or in any case into any organic fraction that has suitable characteristics, in a gas mixture, takes place.

Operating under anaerobic conditions, this mixture mainly includes methane and carbon dioxide, the so-called biogas.

The loading of the equipment takes place at set times, as are the discharges; the digester always works full and at temperatures of between 36 and 42° C.

The gas is sent to a cogeneration system, as described below, and the liquid discharge to the solid phase separation system contained therein.

In the solid/liquid separation step b), a separation of the solid part contained in the digestate is carried out.

For the purposes of the present invention, step b) comprises a step b1) and a step b2).

In a first aspect, in step b1) the filtration is obtained with a filtering system consisting of a vertical liquid-solid separator of the auger type.

In particular, with step b1) the solid part with dimensions greater than 250 300 µm is removed.

As regards step b2), this is carried out on the liquid part decaying from step b1) and is obtained by means of a vibrating screen.

In particular, with step b2) the fraction of suspended solids is further reduced, removing the solid part with dimensions greater than 50-100 µm.

After step b) (or, better, step b2)) and before step c), a dosing step can be possibly carried out, with which the desired quantity of digestate is dosed to the stripping tanks of step c).

If carried out, this step takes place in a suitable tank, which can be replaced with other equivalent weighing and dosing methods.

As regards stripping step c), this is carried out in suitable tanks, inside which the separated liquid, normally at a temperature of 30-35° C., is thermostatically controlled by means of continuous circulation on exchangers.

Pre-heating and a slight insufflation of air are maintained throughout the loading period.

In one aspect of the invention, the heat used is represented by the decaying heat from the electrical cogeneration process.

According to a preferred aspect of the present invention, the stripping tanks are two, so that the plant can be operated continuously.

In more detail, while one tank carries out the stripping step, the other is being loaded.

The process works by alternating the tanks in the filling and stripping steps; emptying is irrelevant since it only lasts a few minutes.

The temperature at which the separated liquid is kept during the stripping process is about 55-65° C. and preferably about 60° C.

Advantageously, this temperature corresponds to that necessary to be able to have the ammonia available as a gaseous phase dispersed in the liquid mass in a percentage equal to or slightly higher than 90% of the total ammonia present in the input digestate, at the pH value reached spontaneously by the digestate subjected to the process.

This pH value is about 9.8 pH units, compared to a value of about 7.8 of the digestate during the feeding step, measured after the separation stages.

The increase in the pH of the solution being treated is due to the decomposition of the carbonate salts, a decomposition which releases carbonic acid in the gas phase, which is removed with the air introduced from the bottom of the tanks during the process.

Advantageously, the process of the invention does not require the addition of chemical additives such as sodium hydrate (soda) or calcium hydrate (lime).

The ammonia which is gradually released converting from the ionic form of ammonium ion ($NH_4^+$) to the molecular form in the gas phase ($NH_3$), is removed from the tank by the flow of air introduced from the bottom.

The process time is a function of the result required by the digestate manufacturer, which can be different in relation to the needs of the same to respond to the law requirements.

Figure 2:
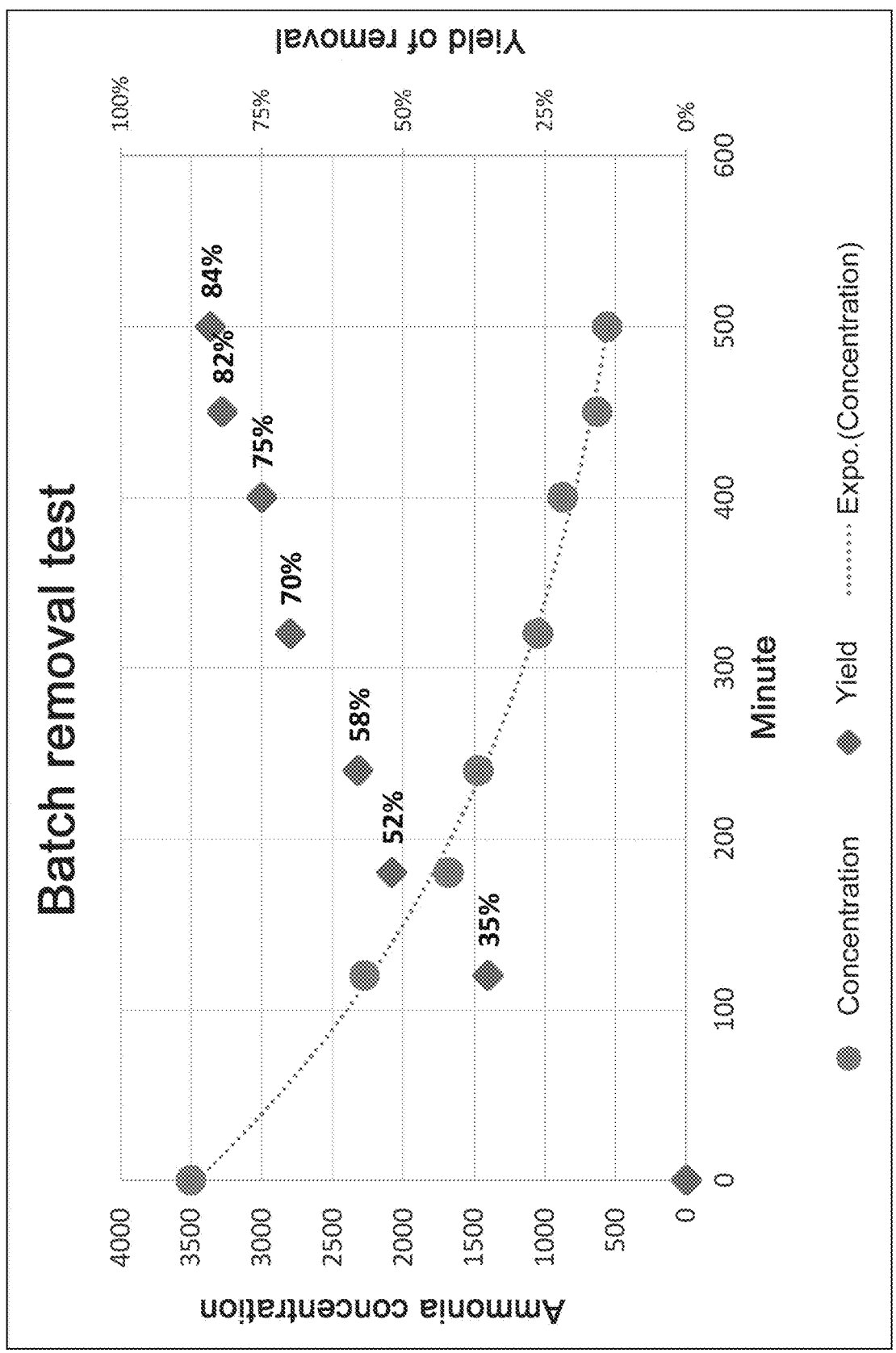
FIG. 2 shows a diagram illustrating a typical ammonia removal curve.

FIG. 2 shows the diagram illustrating a typical removal curve.

If only 70% removal with this digestate type is required, a batch time of 6 hours is sufficient, while a batch time of 8 hours allows an increase of up to 80%.

The increase of up to 90% is obtained with a batch time of about 9 hours, beyond which it is economically inefficient to go.

During step c), a control of the foams is maintained by means of special sensors and/or by the addition of the antifoam agent.

The choice of the antifoam agent and the quantity used depends on the quality of the starting product and the degree of filtration achieved; in general, the lower the SST value present, the lower the tendency to form persistent foams.

In the stripping step c) a compressor is used.

For the purposes of the present invention, the compressor is represented by a volumetric compressor with an insufflation system of medium and medium-fine bubbles connected to the tank bottom.

In a preferred aspect of the invention, this compressor operates at low pressure and preferably at a pressure of about 300 mbar.

For the purposes of the present invention, in which each tank treats about 20 m3/day, the flow rate is about 800-900 m3/h at the pressure mentioned above.

As regards the ammonia absorption step d), this is carried out continuously (and not in batch, as for the other steps).

In fact, the aeriform flow coming from the stripping tanks is washed in countercurrent with an acid solution, inside a filling column (scrubber).

As a result of this step, an ammonium salt is formed, which represents a valorizable product, which can be sold to companies that produce fertilizers.

The management of acid addition takes place in pH control and the extraction of the ammonium salt takes place in simultaneous control of level and pH, to meet both thresholds.

The purified air, virtually free of ammonia, is discharged to the atmosphere according to the limits of the law.

The gas phase (biogas) coming from the anaerobic digesters of step a) is sent to the cogeneration step e).

Cogeneration is possible thanks to an internal combustion engine, connected to a generator that produces electricity.

As for the heat of combustion, this is disposed of through a hot water circuit and partly ends up in the combustion fumes from which it is partially recovered.

The heat thus recovered is used for the operation of the digesters and for the operation of the ammonia removal plant.

Typically, about 38.5% of the energy contained in the biogas is converted into electricity, while the remaining part, about 75%, is used in the other uses described above.

A plant for carrying out the wastewater treatment process as detailed above is also provided.

As shown in FIG. 1, the plant comprises:
a digester,
one or more solid/liquid separators,
possibly a tank for dosing the liquid,
one or more stripping tanks,
a compressor for blowing air into the stripping tank or tanks,
an absorption column (scrubber) for ammonia,
a thermal motor for cogeneration.

For the purposes of the present invention, the separators may comprise a screw-type vertical solid-liquid separator, to remove the solid part with dimensions greater than 250-300

μm and/or a vibrating screen, to separate the solid part with dimensions greater than 100 μm.

From the above description of the present invention, the advantages provided by the present invention are immediately apparent to the man skilled in the art.

Firstly, compared to the biological treatment systems already in operation, the system of the present invention does not disperse the nutrient, represented by ammonia.

Furthermore, the described process does not use chemical additives such as soda or lime, thus avoiding its spreading in the fields and, therefore, pollution and damage to them.

Figure 3:
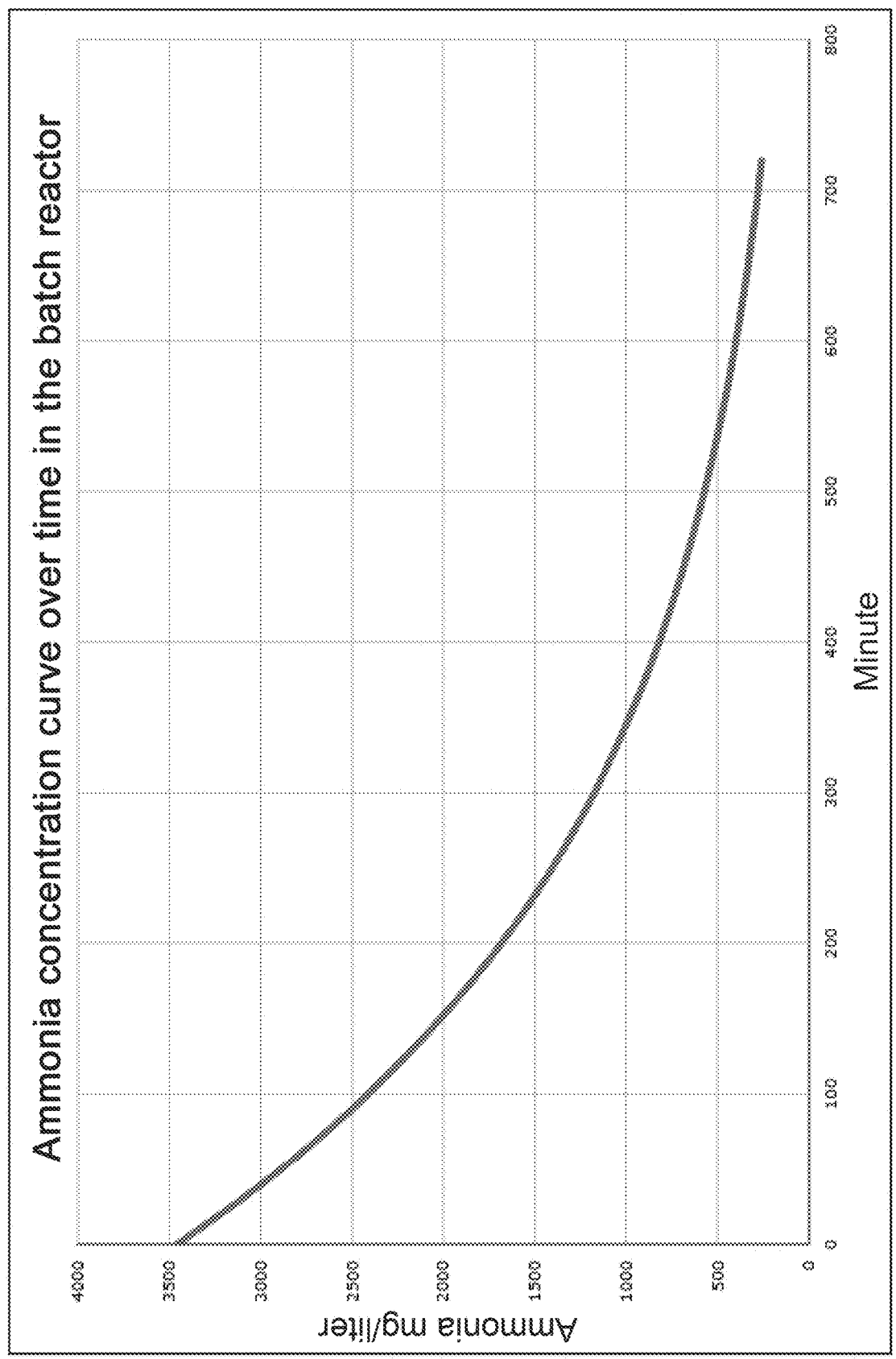
FIG. 3 shows a graph with the ammonia removal curve with respect to time.

As shown in FIG. 3, a batch time of 8 hours corresponds to an ammonia removal yield of about 80%, whereas a yield of 70% is however obtainable with a batch time of 6 hours.

Figure 4:
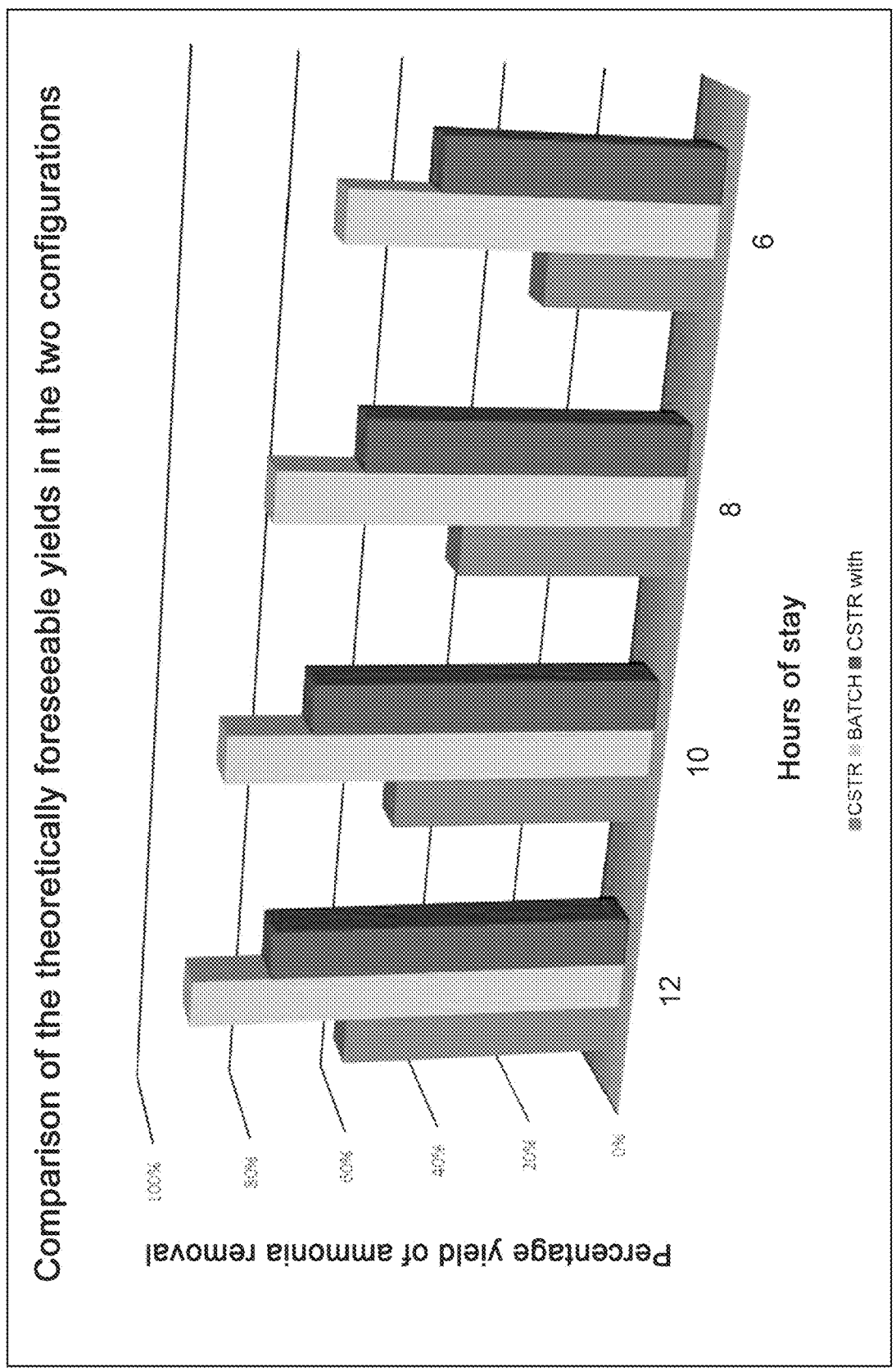
FIG. 4 shows the comparison, for the same process conditions, between a batch plant and a CSTR (Completely Stirred Tank Reactor) plant.

The graph of FIG. 4 clearly shows how a plant according to the present invention is able to provide much higher yields than the stripping plants of the CSTR (Completely Stirred Tank Reactor) type, also providing for the use of soda.

It has also been surprisingly found that the process of the invention provides a treated product which, when leaving the plant, is not free of pathogenic microorganisms, since, in fact, it has undergone a slow pasteurization, for a time that is greater than 2-3 times that typical of slow pasteurization processes.

In the presence of cogeneration plants, the solution of the present patent application does not require energy sources to meet its thermal needs and, moreover, it has modest electrical consumption; for example, for plants that treat 60-70 m3/day, an absorbed consumption of about 20 kWh was noted.

The proposed technology does not require a pH control, thus avoiding the relative problems of periodic calibration of the instrument, which normally occur every week; in fact, maintenance requires periodic cleaning of some parts, such as the exchanger. To this end, an automatic washing system can be provided which also reduces the task of cleaning to practically zero, significantly reducing ordinary maintenance costs.

What is claimed is:

1. A process for the purification of waste from zootechnical sources, organic fraction of municipal solid waste (OFMSW) treatment plants, food companies, or landfill leachate, comprising the steps of:
   a) performing digestion on the waste, thereby producing a biogas and a digestate,
   b) treating the digestate of step a) to separate a solids part from a liquid part,
   c) stripping the liquid part obtained from step b) to remove ammonia, and
   d) treating an aeriform product of step c) to absorb ammonia, wherein sodium hydrate or calcium hydrate is not used in step c);
   wherein step c) is carried out in a single batch tank having a compressor with an insufflation system connected to the bottom of the tank; and
   wherein step c) is carried out:
     at a temperature of about 55 to about 65° C.,
     for about 6 to about 9 hours,
     with an insufflation of air at a flow rate of about 800 to about 900 $m^3/h$.

2. The process of claim 1, wherein step b) comprises a step b1), whereby a portion of solids with dimensions larger than 250-300 μm is removed, and a step b2), carried out on a liquid part decaying from step b1), wherein a portion of solids with dimensions larger than 50-100 μm is removed.

3. The process of claim 1, wherein the air is blown at a pressure of about 300 mbar in step c).

4. The process of claim 1, wherein step d) comprises washing the aeriform product with an acid solution.

5. The process of claim 1, further comprising employing cogeneration using the biogas of step a).

6. The process of claim 5, wherein heat from step e) is used in step c).

7. A wastewater treatment plant for carrying out the process of claim 1, comprising:
   a digester,
   one or more solid/liquid separators,
   a tank for dosing the liquid,
   the single batch tank,
   the compressor for blowing air into the single batch tank,
   an absorption column for ammonia, and
   a thermal motor for cogeneration.

* * * * *